(12) United States Patent
Iida et al.

(10) Patent No.: US 6,638,485 B1
(45) Date of Patent: *Oct. 28, 2003

(54) PROCESS FOR TREATING EXHAUST GAS AND EXHAUST GAS TREATING EQUIPMENT

(75) Inventors: Kozo Iida, Hiroshima-ken (JP); Toru Takashina, Hiroshima-ken (JP); Shintaro Honjo, Hiroshima-ken (JP)

(73) Assignee: Mitsubishi Heavy Industries, Ltd. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 835 days.

(21) Appl. No.: 09/022,817

(22) Filed: Feb. 12, 1998

(30) Foreign Application Priority Data

Feb. 19, 1997 (JP) ................................ 9-050975

(51) Int. Cl.[7] ................................ B01D 53/64
(52) U.S. Cl. ................ 423/210; 423/239.1; 423/239.2; 423/243.01; 423/243.08
(58) Field of Search ............... 423/210, 239.1, 423/239.2, 243.01, 243.08

(56) References Cited

U.S. PATENT DOCUMENTS 4,619,608 A  10/1986  McIntyre et al. ........... 423/220

FOREIGN PATENT DOCUMENTS

| DE | 42 18 672 C1 | 8/1993 | ............ F23G/7/00 |
| DE | 42 08 355 A1 * | 9/1993 | ................ 423/210 |
| EP | 0 614 690 A1 | 9/1994 | .................... 94/37 |
| JP | 56-105733 A * | 8/1981 | ............. 423/239.1 |
| JP | 62-45325 A * | 2/1987 | ................ 423/210 |
| JP | 63-190622 A | 8/1988 | .......... B01D/53/36 |
| JP | 64-70129 A * | 3/1989 | ................ 423/210 |
| JP | 6-126134 A * | 5/1994 | ............. 423/239.1 |
| JP | 6-319950 A * | 11/1994 | ............. 423/239.1 |

OTHER PUBLICATIONS

Ando; *Review of Japanese $No_x$ Abatement Technology for Stationary Sources*, $No_x$–Symposium, University of Kalsruhe, pp. A1–A42, (Feb. 21–22, 1985).

Steinberg; *Environment Protection by Application of Catalysts in Europe–Development and Experience*, Proceedings of First Japan–EC Joint Workshop on the Frontiers of Catalytic Science & Technology for Alternative Energy and Global Environmental Protection, Tokyo, Japan, pp. 117–130, (Dec. 2–4, 1991).

* cited by examiner

Primary Examiner—Stanley S. Silverman
Assistant Examiner—Timothy C. Vanoy
(74) Attorney, Agent, or Firm—Myers Bigel Sibley & Sajovec, P.A.

(57) ABSTRACT

A process for treating an exhaust gas contaminated with dust, Hg, $NO_x$, and $SO_x$ is provided by adding a mercury chlorinating agent, such as, for example, HCl, $NH_4Cl$, or $Cl_2$, and ammonia to the exhaust gas so that the mercury in the exhaust gas is converted to $HgCl_2$. The dust, $HgCl_2$, $NO_x$, $NH_3$, and $SO_x$ containing the exhaust gas may then be passed through a reactor containing a catalyst such as, for example, $V_2O_5$ and/or $MoO_3$ supported on $TiO_2$, which promotes the reaction between the $NO_x$ and $NH_3$ to result in the formation of $N_2$ and $H_2O$. The $HgCl_2$ and $SO_x$ containing exhaust gas is then passed through a scrubbing tower where the gas is scrubbed with aqueous solutions of absorbents such as $CaCO_3$ and $Ca(OH)_2$, so that $HgCl_2$ and $SO_x$ are removed from the exhaust gas. The cleaned exhaust gas is discharged through a stack.

2 Claims, 1 Drawing Sheet

CONCENTRATION OF
HYDROGEN CHLORIDE (ppm)

PROCESS FOR TREATING EXHAUST GAS AND EXHAUST GAS TREATING EQUIPMENT

BACKGROUND OF THE INVENTION

1. Field of the Invention

The present invention relates to a process for treating exhaust gas containing dust, $NO_x$, and $SO_x$ (hereinafter simply called "exhaust gas") such as coal burned exhaust gas, heavy oil burned exhaust gas, and the like.

2. Summary of the Invention

At present, there are no methods for treating metal mercury or mercury compounds (hereinafter generically called "mercury" unless otherwise noted) in exhaust gas and for performing denitration and desulfurization at the same time in the method for removing $SO_2$ in a wet desulfurizing unit using an alkaline absorbing solution as an absorbent after removing $NO_x$ from the exhaust gas in a reduction denitrating unit.

There are known methods for removing mercury with a high concentration from exhaust gas using an adsorbent such as activated carbon or a selenium filter. These methods however require a special adsorption-removing unit and hence are not adaptable to treatment of vast exhaust gas such as flue gas.

There are also the methods in which exhaust gas and an absorbing solution are subjected to gas-liquid contact to remove mercury using a scrubber without alteration of a conventional exhaust gas treating system. In these methods, however, there is the problem that metal mercury which is less soluble in water cannot be almost removed though mercury compounds, e.g. $HgCl_2$ which have relatively large solubility in water can be removed.

Combustion exhaust gas from a boiler 1 is introduced into a reduction denitrating unit 5. An ammonia injecting unit 2 for injecting, into the exhaust gas, $NH_3$ supplied from an ammonia tank 3 is installed in the passage to the reduction denitrating unit 5. The exhaust gas into which $NH_3$ is injected is denitrated in the reduction denitrating unit 5 in which $NO_x$ is converted into nitrogen by a selective reducing reaction shown by the following chemical formula:

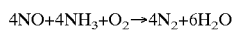

The denitrated exhaust gas is allowed to flow through an air preheater 6 and a heat exchanger 7 to reach an electric precipitator 8 where dust is removed. Then $SO_2$ in the exhaust gas is removed in a wet desulfurizing unit 9. In the case where mercury is contained as HgCl or $HgCl_2$, HgCl or $HgCl_2$ contained in the exhaust gas is dissolved in water through gas-liquid contact in the wet desulfurizing unit 9 whereby mercury is removed. However, in the case where mercury is contained as metal mercury which can be scarcely dissolved in water, mercury is removed at a lower removal rate and is almost vented from a stack 11 through a heat exchanger 10.

In order to remove metal mercury, it is required to install newly a mercury adsorption-type removing unit, e.g. an activated carbon filter, between the wet desulfurizing unit 9 and the heat exchanger 10 or between the heat exchanger 10 and the stack 11.

In the above method for treating mercury using the mercury adsorption-type removing unit, there is the problem of high facilities and operation costs in continuous treatment for vast exhaust gas having a lower mercury concentration. While, with intensified regulation of environmental pollutant emission, there is strong needs for developing inexpensive treating technologies for removing heavy metals such as mercury and the like.

It is an object of the present invention to provide a treating technology which is reduced in costs of facilities and operation.

The present inventors have studied various processes for removing mercury and as a result found that mercury can be efficiently removed in a wet desulfurizing unit by converting metal mercury into a water-soluble compound, to complete the present invention.

Accordingly, the above object can be attained by a provision of a process for treating exhaust gas comprising adding a mercury chlorinating agent such as ammonium chloride or HCl and ammonia to combustion exhaust gas containing $NO_x$, $SO_x$, and mercury to carry out reduction denitration in the presence of a solid catalyst; and wet-desulfurizing the denitrated exhaust gas using an alkaline absorbing solution.

In preferred embodiments of the present invention, the mercury chlorinating agent is ammonium chloride or HCl; and the solid catalyst includes a carrier composed of at least one compound selected from the group consisting of $TiO_2$, $SiO_2$, and $ZrO_2$ and/or zeolite and at least one element selected from the group consisting of Pt, Ru, Rh, Pd, Ir, V, W, Mo, Ni, Co, Fe, Cr, Cu, and Mn is carried by said carrier.

Also, the object of the present invention can be attained by the provision of a combustion exhaust gas treating equipment comprising a reduction denitrating unit, a wet desulfurizing unit, a mercury chlorinating agent injecting unit, and an ammonia injecting unit; wherein a mercury chlorinating agent from said mercury chlorinating agent injecting unit and ammonia from said ammonia injecting unit are added to combustion exhaust gas containing $NO_x$, $SO_x$, and mercury to carry out reduction denitration in the presence of a solid catalyst; and the denitrated exhaust gas is wet-desulfurized using an alkaline absorbing solution.

In the present invention, it is possible to remove mercury in exhaust gas in a highly efficient manner using inexpensive chemicals such as HCl without a large change in a conventional system but with a simple reform, e.g. a HCl injecting unit attached. The present invention is therefore very advantageous in view of operating costs including plant costs, costs of chemicals, and maintenance costs.

DETAILED DESCRIPTION OF THE PREFERRED EMBODIMENT

Figure 1:
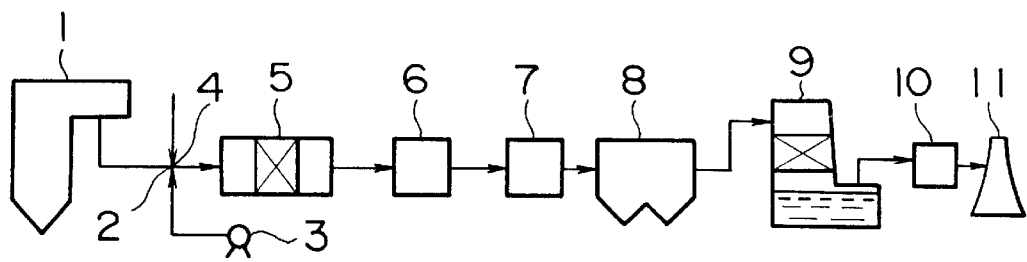
FIG. 1 is a view showing an embodiment of a structure of an exhaust gas treating equipment corresponding to the present invention.

The present inventors have found that, in the case where mercury is contained as HgCl or $HgCl_2$, the mercury can be completely removed through gas-liquid contact in the wet desulfurizing unit, but mercury cannot be almost removed in the case where mercury is contained as metal mercury which can be scarcely dissolved in water.

The present inventors have found that metal mercury in exhaust gas can be converted into $HgCl_2$ on a denitrating catalyst in the presence of HCl according to the following chemical formula (3):

$$Hg + HCl + (1/2)O_2 \rightarrow HgCl_2 + H_2O \qquad (3)$$

Accordingly, metal mercury can be oxidized to $HgCl_2$ in the reduction denitrating unit by adding HCl or the like to mercury.

On the other hand, when coal or heavy oil(fuel oil) is used as the fuel, the combustion gas contains Cl components since these fuels include Cl. The content of the Cl components in the fuel varies depending on the type of fuel and hence the concentration of the Cl components is difficult to control. Therefore, it is desirable that HCl or the like be added to the exhaust gas in the upper stream side of the reduction denitrating unit in an amount more than required to remove mercury perfectly.

Specifically, the present invention relates to a method and equipment in which metal mercury is converted into a largely water-soluble chloride on a denitrating catalyst by adding a mercury chlorinating agent such as HCl or the like to the exhaust gas containing the mercury in the upper stream side of the reduction denitrating reaction unit and mercury is efficiently removed in the wet desulfurizing unit installed in the lower stream side of the reduction denitrating unit.

Exhaust gas subjected to the treatment in the present invention includes exhaust gas from boilers of thermal power plants, factories, and the like and exhaust gas from furnaces of metal factories, petroleum refineries, petrochemical factories, and the like, which are produced from the combustion of fuels such as coal, heavy oil, or the like which contains sulfur, mercury, and the like. Such an exhaust gas is massive and contains a low concentration of $No_x$ and a certain amount of carbon dioxide, oxygen, $So_x$, dust, and water.

In the reduction denitrating process of the present invention, $No_x$ in exhaust gas is reduced to nitrogen using ammonia as a reducing agent in the presence of a solid catalyst.

Ammonia is injected according to a conventional process.

Examples of the solid catalyst used for the reduction denitration in the present invention include materials in which an oxide or sulfate of a metal such as V, W, Mo, Ni, Co, Fe, Cr, Mn, Cu, or the like or a precious metal such as Pt, Ru, Rh, Pd, Ir, or the like or a mixture of these is carried on a carrier such as titania, silica, zirconia, or a complex oxide of these, and/or zeolite.

The mercury chlorinating agent used in the present invention is a type which reacts with mercury in exhaust gas in the presence of the above catalyst to produce $HgCl_2$ and/or HgCl. Examples of the mercury chlorinating agent include HCl, ammonium chloride, chlorine, hypochlorous acid, ammonium hypochlorite, chlorous acid, ammonium chlorite, chloric acid, ammonium chlorate, perchloric acid, ammonium perchlorate, as well as amine salts or other salts of the above acids.

The amount of the mercury chlorinating agent added to exhaust gas may be a stoichiometric amount or slightly more for the amount of mercury such as metal mercury which can be dissolved in water with difficulty. In the case where coal or heavy oil is used as the fuel, the concentration of the mercury chlorinating agent is 1000 ppm or less and actually around 10 to 100 ppm for the amount of the exhaust gas.

A chemical agent for HCl used in the present invention may be either hydrogen chloride or hydrochloric acid. Examples of hydrochloric acid include concentrated hydrochloric acid to 5% dilute hydrochloric acid though there are no limitations to its concentration.

As an apparatus for adding HCl to the exhaust gas, a conventional fixed delivery pump for liquid chemicals may be used.

When adding salts such as ammonium chloride or the like, it is desirable to use an aqueous solution of the salt.

The mercury chlorinating agent may be added either before or after the addition of ammonia to the exhaust gas.

As the wet desulfurizing unit, a conventional unit may be used. Examples of the absorbing solution include aqueous solutions of absorbents (called "alkaline absorbing solution") such as calcium carbonate, calcium oxide, calcium hydroxide, sodium carbonate, sodium hydroxide, or the like.

The present invention is now explained with reference to the drawings. FIG. 1 is a view showing an embodiment of a structure of the exhaust gas treating unit of the present invention. In FIG. 1, an ammonia injecting unit 2 for injecting $NH_3$ supplied from an ammonia tank 3 into exhaust gas and HCl injecting unit 4 are installed in the passage between a boiler 1 and a reduction denitrating unit 5. Exhaust gas from the boiler 1 is introduced into the reduction denitrating unit 5. $No_x$ in the exhaust gas into which $NH_3$ and HCl are injected reacts with $NH_3$ and metal Hg is oxidized to $HgCl_2$ in the presence of HCl in the reduction denitrating unit 5 at the same time. The exhaust gas flows through an air preheater 6 and a heat exchanger 7 to reach an electric precipitator 8 where dust is removed and then $SO_2$ and $HgCl_2$ in the exhaust gas are removed at the same time in a wet desulfurizing unit 9.

An excess amount of HCl which is contained in the exhaust gas discharged from the reduction denitrating unit is absorbed by an aqueous alkali solution such as a limemilk or the like in the wet desulfurizing unit so that it is not discharged from a stack.

The present invention relates to a method for treating exhaust gas comprising steps of removing $No_x$ from exhaust gas in a reduction denitrating unit and $SO_2$ from the exhaust gas in a wet desulfurizing unit using an alkaline absorbing solution as the absorbent, characterized in that a mercury chlorinating agent is added to the exhaust gas in the upper stream side of the reduction denitrating unit. In this method of the present invention, $NH_3$ is only required for denitration. Even if $NH_3$ is not added to the exhaust gas in the upper side of the reduction denitrating unit, there is no change in the effects of the present invention in which mercury is converted into a chloride by a mercury chlorinating agent in the presence of a catalyst in the reduction denitrating unit and mercury is removed in the wet desulfurizing unit.

EXAMPLES

The present invention will be explained in more detail by way of examples, which are not intended to be limiting of the present invention.

Example 1

Exhaust gas was treated using a pilot plant having a structure shown in FIG. 1 according to the conditions illustrated below.

Exhaust Gas
  Type: combustion exhaust gas of dust coal
  Flow rate: 200 $Nm^3$/hr (dry base)
  Concentration of dust: 20 $g/Nm^3$
  Concentration of $SO_2$: 800 ppm (dry base)

Concentration of $No_x$: 250 ppm (dry base)

Concentration of mercury: 10 ppb (dry base)

Concentration of oxygen: 5% by volume

Reduction Denitrating Condition

Mol ratio of $NH_3/No_x$: 0.9

HCl/exhaust gas: 50 ppm

Catalyst: titania of a type having a honeycomb structure and carrying 0.6% by weight of $V_2O_5$ and 8% by weight of $WO_3$ Conditions of Wet Desulfurization Absorbing solution: an aqueous 1% suspension of calcium carbonate powder, 90% of which passes through a 325 mesh filter Ratio of absorbing solution/exhaust gas: 17.5 little/$Nm^3$ 97% of metal mercury was removed as a result of this treatment.

Comparative Example 1

The same procedures as in Example 1 were conducted except that HCl was not added to exhaust gas, resulting in that 60% of metal mercury was removed.

It is clear from the above result that removal of metal mercury is greatly improved by adding HCl to exhaust gas in the upper stream side of the reduction denitrating unit.

Example 2

Exhaust gas treatments were performed according to Example 1 using various concentrations of HCl to measure the relation between the rate of removal of metal mercury and the concentration of HCl. The results are shown in FIG. 2.

Figure 2:
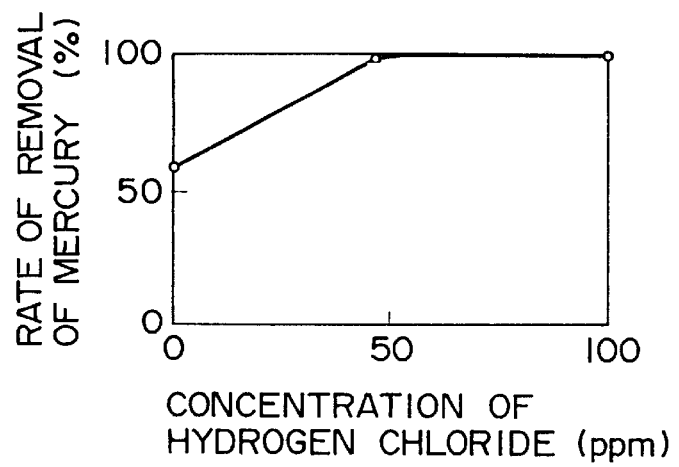
FIG. 2 is a view showing the relation (experimental result) between the rate of removal of mercury and the concentration of HCl added to exhaust gas.
Figure 3:
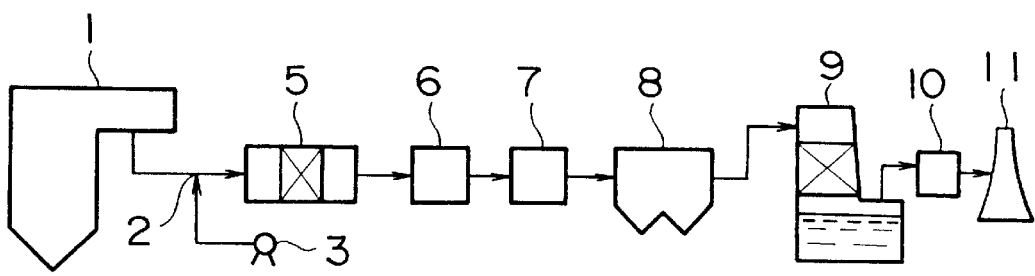
FIG. 3 is a view showing an embodiment of a structure of a conventional exhaust gas treating equipment.

It is confirmed from FIG. 2 that the rate of removal of metal mercury can be kept high by adjusting the concentration of HCl to 50 ppm or more.

Excess HCl in exhaust gas was completely removed in the wet desulfurizing unit and hence it was never discharged from the stack.

Example 3

The same procedures as in Example 1 were performed except that calcium oxide, calcium hydroxide, sodium carbonate, or sodium hydroxide was used as the absorbent used in the wet desulfurizing unit.

In any case of using these absorbents, mercury could be removed in the same manner as in the case of using calcium carbonate.

It is clear from the above result that the rate of removal of mercury does not depend on the type of absorbent used in the wet desulfurizing unit.

Example 4

The same procedures as in Example 1 were performed except that the same amount of ammonium chloride having the same concentration was added in place of HCl, resulting in that metal mercury could be removed at almost the same rate as in Example 1.

Many other variations and modifications of the invention will be apparent to those skilled in the art without departing from the spirit and scope of the invention. The above-described embodiments are, therefore, intended to be merely exemplary, and all such variations and modifications are intended to be included within the scope of the invention as defined in the appended claims.

The disclosure of Japanese Patent Application No.9-50975 filed on Feb. 19, 1997 including specification, claims, drawings and summary are incorporated herein by reference in its entirety.

What is claimed is:

1. A process for treating combustion exhaust gas comprising:

adding a mercury chlorinating agent and ammonia to combustion exhaust gas containing $NO_x$, $SO_x$, and mercury to carry out removal of nitrogen oxides from the exhaust gas in the presence of a solid catalyst comprising: (1) a carrier comprised of at least one compound selected from the group consisting of $TiO_2$, $SiO_2$, $ZrO_2$, and zeolite, and (2) at least one element selected from the group consisting of Pt, Ru, Ir, V, W, Mo, Ni, Co, Fe, Cr, Cu, and Mn, wherein said element is carried by said carrier, and wherein the mercury chlorinating agent is added in an amount greater than the stoichiometric amount relative to the mercury present in the exhaust gas to produce a mercury chloride; and wet-desulfurizing the denitrated exhaust gas using an alkaline absorbing unit.

2. A process for treating combustion exhaust gas according to claim 1, wherein said mercury chlorinating agent is a compound selected from the group consisting of ammonium chloride and HCl.

* * * * *